United States Patent
Vincent et al.

(10) Patent No.: US 7,580,239 B2
(45) Date of Patent: Aug. 25, 2009

(54) CAPACITIVE LATCHED BI-STABLE MOLECULAR SWITCH

(75) Inventors: Kent D. Vincent, Palo Alto, CA (US); Xiao-An Zhang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 209 days.

(21) Appl. No.: 11/478,278

(22) Filed: Jun. 29, 2006

(65) Prior Publication Data
US 2008/0002333 A1 Jan. 3, 2008

(51) Int. Cl.
*H01G 4/06* (2006.01)
*G02F 1/035* (2006.01)
*H01L 35/24* (2006.01)
*H01L 51/00* (2006.01)

(52) U.S. Cl. .............................. 361/311; 385/2; 257/40
(58) Field of Classification Search ................. 361/502, 361/311; 257/14, 40; 385/2
See application file for complete search history.

(56) References Cited

U.S. PATENT DOCUMENTS

| 5,866,284 | A | 2/1999 | Vincent |
| 6,430,511 | B1 * | 8/2002 | Tour et al. .................. 702/19 |
| 6,674,932 | B1 | 1/2004 | Zhang et al. |
| 6,701,035 | B2 | 3/2004 | Zhang et al. |
| 6,751,365 | B2 | 6/2004 | Zhang et al. |
| 6,795,230 | B1 | 9/2004 | Vincent et al. |
| 6,805,817 | B2 | 10/2004 | Zhang et al. |
| 6,822,893 | B2 | 11/2004 | Vincent et al. |
| 6,867,427 | B2 | 3/2005 | Zhang et al. |
| 6,888,978 | B2 | 5/2005 | Zhang et al. |
| 6,920,260 | B2 | 7/2005 | Zhang et al. |
| 6,934,424 | B2 | 8/2005 | Zhang et al. |
| 2003/0071800 | A1 | 4/2003 | Vincent et al. |
| 2005/0052983 | A1 | 3/2005 | Vincent et al. |
| 2006/0060636 | A1 | 3/2006 | Daves et al. |

OTHER PUBLICATIONS

Keto-Enol Tautomerism, Feb. 19, 2002.*

* cited by examiner

*Primary Examiner*—Eric Thomas
*Assistant Examiner*—David M Sinclair
(74) *Attorney, Agent, or Firm*—David W. Collins

(57) ABSTRACT

A charge storage cell is made up of two electrodes spaced apart by a dielectric layer incorporating a molecular switch. A method of operating a bi-stable, molecular switch charge storage cell encompassing two electrodes spaced apart by a dielectric layer incorporating a molecular switch having an electric dipole is also disclosed. The method involves applying a voltage across said dielectric layer to induce opposing charges on said electrodes that create an electric field across said dielectric layer, wherein molecular dipoles within said dielectric layer align or change in response to said electric field, creating an opposing electric field and a change in state of said molecular switch from a first state to a second state; and applying a voltage of reverse polarity across said dielectric aver to change said state of said molecular switch from said second state to said first state.

9 Claims, 6 Drawing Sheets

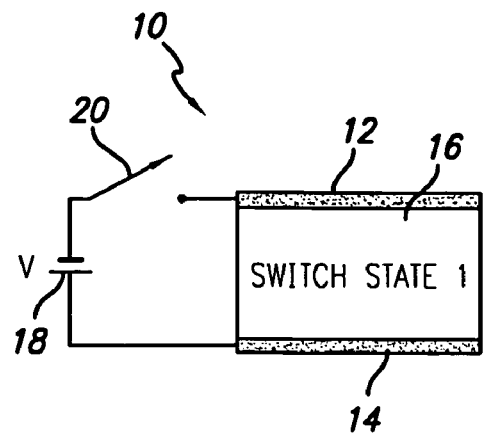
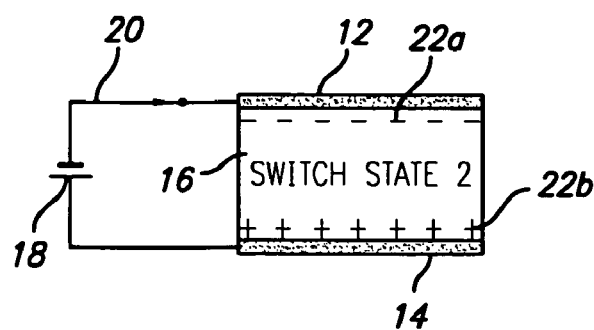
FIG. 1a          FIG. 1b
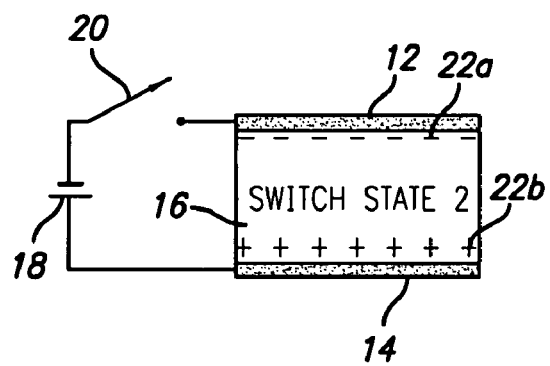
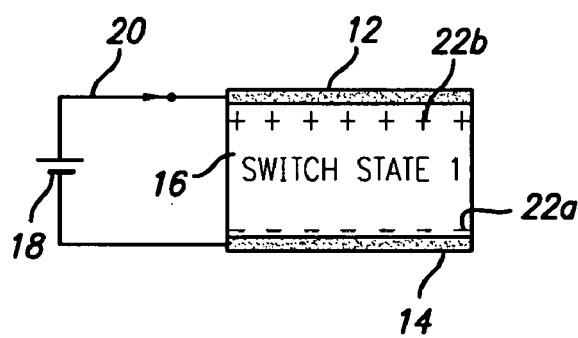
FIG. 1c          FIG. 1d
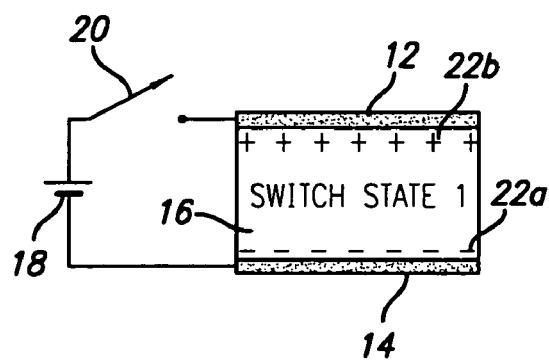
$$q = \frac{\varepsilon \varepsilon_0 AV}{d}$$
FIG. 1e $q = CV(1-e^{-1/RC})$

CAPACITIVE LATCHED BI-STABLE MOLECULAR SWITCH

BACKGROUND ART

The present invention is directed to an organic film having electric field switchable molecules.

Researchers at HP Labs have conceptually developed and significantly built a novel molecular switch capable of changing color from one state to another under the influence of an electric field. These concepts have been the subject of numerous patent applications and patents filed by the present inventors and their colleagues. In general, the color change occurs through a molecular conformation change that alters the degree of electron conjugation across the molecule and, thereby, its molecular orbital induced HOMO-LUMO (highest occupied molecular orbital—lowest unoccupied molecular orbital) states. In one embodiment, the conformation change occurs through field rotation of a ring or rings within the molecule. In this instance, the conjugation is broken, or interrupted, between the rotating rings, called rotors, and ring structures that do not rotate, called stators. The rotors have electric dipoles that induce rotation within a given field. A coupling group (e.g., acetylene) between the rotor and stator elements serves as a "bearing" and conjugation bridge between the rotor and stator. The infinitesimal rotor inertia and frictional resistance of the rotor allows color switching times on the order of a nanosecond based on models. A method to create bi-stable color states has been disclosed wherein planes of rotor-stator cells are spaced and superimposed to allow interplane rotor-to-rotor dipole latching. Such bi-stability allows a color state to remain stable, potentially indefinitely, in the absence of an electric field.

It is desired to provide a unique set of dye-like optical properties that make it ideal for applications such as electronic paper, paper-like displays, electronic books, projection displays and the like. Such embodiments and properties are described in a number of patent applications and patents. Desirably, the high color switching speed and bi-stable color state attributes of the molecular switch allows time-modulated grayscale, passive matrix addressed full motion color video imaging. These features are collectively disclosed in additional patent applications and patents.

Conformational change rotor-stator molecules have been disclosed for electronic switching and memory devices, while a novel rotor-stator molecule-based media has been disclosed for electro-optic switched disk memory.

More recently, polarization-type switching materials have been disclosed. The polarization-type switch comprises molecules that are chromophores capable of being switched between two tautomeric forms through the action of an externally applied electric field coupled through an acceptor-donor dipole incorporated in the chromophore.

Switch state bi-stability is highly desirable for each of the envisioned molecular switch applications. Switch bi-stability enables image and electronic memory archivability, eliminates pixel refresh addressing for lowest display, memory and electronic circuit drive power requirement, enables time-modulated gray-scale and passive matrix addressing. The bi-stable structures disclosed thus far require precise alignment and spacing of rotor dipoles and molecular self-assembly. It is therefore, highly desirable, to discover bi-stability schemes that are less structurally rigorous.

DISCLOSURE OF INVENTION

In accordance with the embodiments disclosed herein, a charge storage cell comprises two electrodes spaced apart by a dielectric layer incorporating a molecular switch.

BRIEF DESCRIPTION OF THE DRAWINGS

FIGS. 1a-1e depict, in cross-section, an embodiment of a charge storage capacitor incorporating a layer comprising a molecule in a dielectric at different stages of application of an electric field;

BEST MODES FOR CARRYING OUT THE INVENTION

Figure 2A:
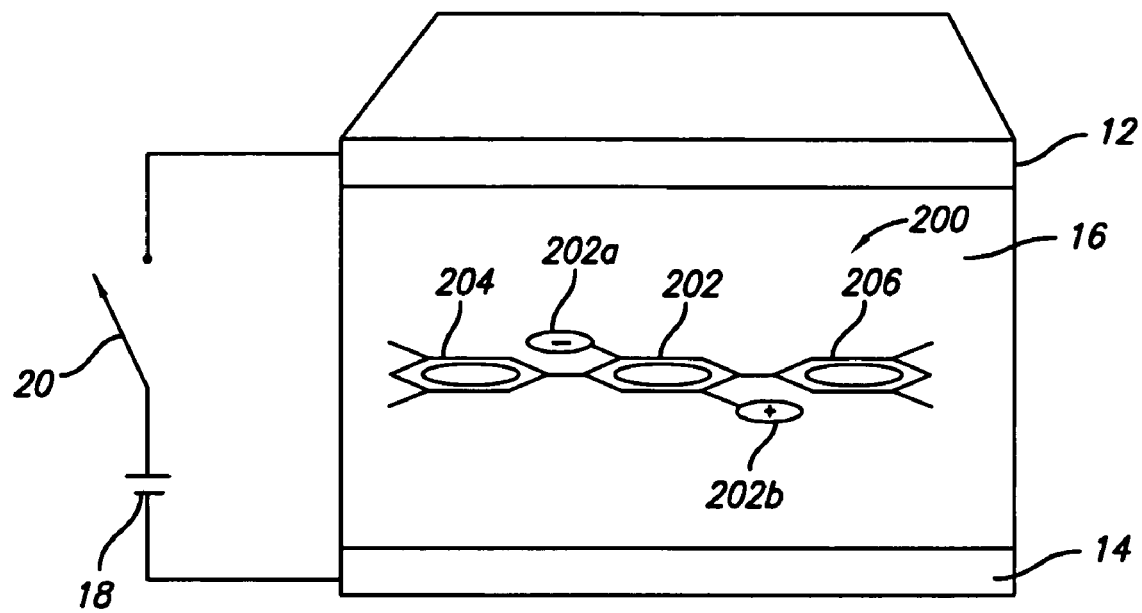
FIGS. 2a-2d depict the state of rotors with respect to stators as a function of the presence or absence of an applied electric field and as a function of the direction of the electric field, with reference to FIGS. 1a-1e.

Reference is made now in detail to specific embodiments, which illustrates the best mode presently contemplated by the inventors for practicing the invention. Alternative embodiments are also briefly described as applicable.

Definitions

The term "self-assembled" as used herein refers to a system that naturally adopts some geometric pattern because of the identity of the components of the system; the system achieves at least a local minimum in its energy by adopting this configuration.

The term "singly configurable" means that a switch can change its state only once via an irreversible process such as an oxidation or reduction reaction; such a switch can be the basis of a programmable read-only memory (PROM), for example.

The term "reconfigurable" means that a switch can change its state multiple times via a reversible process such as an oxidation or reduction; in other words, the switch can be opened and closed multiple times, such as the memory bits in a random access memory (RAM) or a color pixel in a display.

The term "bi-stable" as applied to a molecule means a molecule having two relatively low energy states separated by an energy (or activation) barrier. The molecule may be either irreversibly switched from one state to the other (singly configurable) or reversibly switched from one state to the other (reconfigurable). In this connection, it will be appreciated that the switching molecule of this invention does not need to have two stable states. The purpose of the capacitive latch is to hold the switching molecule in its higher, unstable color state by a latched field produced between the electrodes and the dielectric film composed of the switching molecules—as in a charge storage capacitor.

Micron-scale dimensions refers to dimensions that range from 1 micrometer to a few micrometers in size.

Sub-micron scale dimensions refers to dimensions that range from 1 micrometer down to 0.05 micrometers.

Nanometer scale dimensions refers to dimensions that range from 0.1 nanometers to 50 nanometers (0.05 micrometers).

Micron-scale and submicron-scale wires refers to rod or ribbon-shaped conductors or semiconductors with widths or diameters having the dimensions of 0.05 to 10 micrometers, heights that can range from a few tens of nanometers to a micrometer, and lengths of several micrometers and longer.

"HOMO" is the common chemical acronym for "highest occupied molecular orbital", while "LUMO" is the common chemical acronym for "lowest unoccupied molecular orbital". HOMOs and LUMOs are responsible for electronic conduction in molecules and the energy difference between the HOMO and LUMO and other energetically nearby molecular orbitals is responsible for the color of the molecule.

An optical switch, in the context of the present invention, involves changes in the electromagnetic properties of the molecules, both within and outside that detectable by the human eye, e.g., ranging from the far infra-red (IR) to deep ultraviolet UV). Optical switching includes changes in properties such as absorption, reflection, refraction, diffraction, and diffuse scattering of electromagnetic radiation.

The term "transparency" is defined within the visible spectrum to mean that optically, light passing through the colorant is not impeded or altered except in the region in which the colorant spectrally absorbs. For example, if the molecular colorant does not absorb in the visible spectrum, then the colorant will appear to have water clear transparency.

Various embodiments are disclosed below. The first main embodiment is directed to a capacitive latched bi-stable molecular switch. The second main embodiment is directed to a capacitive latched bi-stable polarization-type molecular switch. These embodiments employ two primary types of switching molecules, with the former embodiment directed to molecules that utilize a rotor-stator configuration and the latter embodiment directed to molecules that utilize charge separation. Both types of switching may be considered to exhibit polarization.

As used herein "polarization" is the alignment of and/or creation of a dipole in the direction of an electric field. It is through molecular polarization that the dielectric materials disclosed and claimed herein create a counter-field to the electrode induced E field and thereby create the capacitive latch, as in a charge storage capacitor. Polarization is used to describe the mechanism of charge separation. Likewise, when the rotor of the rotor-stator chemistry disclosed and claimed herein rotates into the E field, it is also polarized. Thus, the chemistry employed herein may be considered as being of two polarization types.

Further, variations may also be considered, in which, for example, the polarization occurs in an accomplice molecule whose changed properties (e.g., acid or base creation) promotes a color change in an associated chromophore.

Alternatively, the polarization may also take place in the supportive (dielectric) media itself (this may occur regardless of intent). In this sense, the switchable dye can be considered added to the dielectric layer of an existing charge storage capacitor. When the dielectric layer (e.g., polymer-containing dye) holds a charge in the absence of an applied field, the included dye molecule appears bi-stable. Both the dielectric layer material and the switchable dye become polarized in most imaginable scenarios, each contributing to the holding charge that creates the bi-stable state. The dielectric material contributes to the holding charge and the bi-stable state, as well as the switching molecule.

A. Capacitive Latched Bi-Stable Molecular Switch (Rotor-Stator Configuration)

The present teachings are directed to a bi-stable, molecular switch charge storage cell, comprising two opposed electrodes and a resistance layer capable of holding charge located therebetween, and a passive matrix addressing scheme based on each.

The passive matrix addressing scheme is not specifically disclosed but is understood in the art. Passive matrix addressing means that a pixel may be addressed by applying a momentary voltage across a crossbar electrode pair such that the switched color state remains stable when the momentary voltage is removed. That is, there is no holding external voltage required to keep the switched color state active. Passive matrix addressing is usually compared to "active" matrix addressing wherein each crossbar pixel is associated with a transistor and capacitor. The pixel is addressed by momentarily applying a voltage across the transistor and capacitor. The transistor is turned on such that it maintains a field across the electrodes when the momentary voltage is removed. Adding a transistor to a pixel is very expensive and eclipses some of the visible area of the pixel.

Specifically, a charge storage capacitor 10 comprises two electrodes 12, 14 spaced apart by a dielectric layer 16 incorporating a molecular switch, as shown in FIGS. 1a-1e. A voltage source 18 generates a voltage V that can be applied to the electrodes 12, 14, and is controlled by an ON-OFF switch 20. In FIG. 1a, the switch 20 is open, and no voltage is applied to the electrodes 12, 14. This is termed "switch state 1".

A voltage V applied across the dielectric layer 16 induces opposing charges 22a (−) and 22b (+) on the electrodes 12, 14, respectively, that create an electric field across the dielectric layer (FIG. 1b). Molecular dipoles (not shown in FIGS. 1a-1e, but shown in FIGS. 2a-2d) within the dielectric layer 16 align or change in response to the field V, creating an opposing field and a change in the molecular switch state from the first switch state to a second state ("switch state 2").

When the electrode voltage is removed, as shown by the open position of the ON-OFF switch 20 in FIG. 1c, the charge on the electrodes 12, 14 is maintained by the opposing field within the dielectric layer 16, maintaining also the field-induced second switch state.

The second switch state remains stable until the electrode charge sufficiently leaks away, or is nullified or reversed by an opposing voltage (FIG. 1d), wherein the ON-OFF switch 20 is closed. The molecular switch state reverts to the first switch state.

Again, when the electrode voltage is removed, as shown by the open position of the ON-OFF switch 20 in FIG. 1e, the charge on the electrodes 12, 14 is maintained by the opposing field within the dielectric layer, maintaining also the field-induced first switch state.

The construction and operation of the present bi-stable molecular switch 10 is, thus, identical to a conventional charge storage capacitor, with the exception that the molecular dipoles that define the conventional capacitor dielectric constant also define and induce molecular switch states.

This is a very important distinction, and is clearly different than capacitive latches for other types of switch mechanisms.

The current invention involves polarization of a molecule (rotor rotation or intramolecular electron polarization) that is commensurate with the polarization of dipoles in a common charge storage capacitor. Such a switch operates at very high frequencies. One could imagine a capacitive latch being applied to an E-Ink type switch, for example. The E-Ink switch involves a polarization of particles, that is, charge-based particle separation in a liquid medium. More specifically, E-Ink and other electrophoretic displays transfer oppositely charged and colored particles in and out of the plane of view. These electrophoretically-separated charged particles are capable of producing a counter field that will form a bi-stable switch state. The charged particles, however, are not molecular switches and switch color by the movement of fixed color particles and not by a fundamental change in the HOMO-LUMO band gap of the colorant.

The molecular switch disclosed herein comprises an electric dipole that induces a molecular switch state change in the presence of an externally applied electric field. Such switch states are generally described in the art described above and include color, refractive index and electrical conductivity states. The molecular switches of the art include molecules that undergo dipole-induced conformational change. Molecules having dipole induced switch states other than by conformation change are equally applicable to the present invention. Dipole response to an electric field may include a change in dipole magnitude as well as alignment.

The construction and operation of the molecular switch shall now be given by way of example. One embodiment of a color switch comprises a stack of planar, conjugated aryl rings that form a colorant; see, e.g., U.S. Pat. No. 6,795,230 B1, issued Sep. 21, 2004, the contents of which are incorporated herein by reference. Each plane comprises alternating stationary and axially rotatable rings, known as stators and rotors, respectively, that are coupled by conjugating elements, such as acetylene groups. The rotors are coaxially coupled to the stators to allow free rotation, while the stators are non-coaxially coupled or otherwise restricted from rotation. Each rotor has an attached electric dipole comprising an electron donor or acceptor group, or both. In the presence of an externally applied electric field, the dipole aligns with the field, thereby rotating its rotor out of the plane of stators and deconjugating the rotor-stator colorant in the process. Such deconjugation alters the HOMO-LUMO molecular state of the colorant. The planar conjugated and non-planar deconjugated orientations thereby constitute two different colorant states. Preferably, a first state is visibly colored while the second state is non-colored transparent. Since detailed descriptions of the rotor-stator design are given extensively elsewhere, they will not be given further here.

In general, the rotor dipole moment and rotor-to-stator ratio are both designed optimally large to minimize the electric field and, hence, voltage necessary to switch the colorant. A large dipole moment increases the torque applied to the rotor in a given field. A large rotor-to-stator ratio increases the field energy that is coupled into the colorant to change its state. For the purposes of the present teachings, the increased dipole moment and rotor-to-stator ratio increases the magnitude and density of dipoles in the dielectric layer, proportionately increasing its dielectric constant (∈). As used herein, a large dipole moment is typically greater than 4 Debye and, in some embodiments, greater than 7 Debye. The required dipole for switching purposes depends on the switching energy and rotor-stator ratio.

Likewise, the colorant is designed for extensive in-plane conjugation to maximize the extinction coefficient of the colorant. The term "extensive in-plane conjugation" is a relative measure dependent on the construction of the chromophore. As employed herein, "extensive" plane conjugation may be defined as the combination of two elements: 1) an optically effective conjugation of rings and fused rings 2) that are substantially planar and thus conjugating. The more conjugation, the greater the extinction coefficient. Also, the inclusion of hetero atoms in the conjugation pathway significantly increases the extinction coefficient by means of resonance.

Maximizing the extinction coefficient of the colorant minimizes the colorant thickness (d) needed to achieve a desired optical density, again minimizing switching voltage. Both increased colorant dielectric constant and minimized colorant thickness are highly desired in the present invention to maximize the holding charge induced on the electrodes (q~∈/d) as shown in the standard capacitor charge equation:

$$q = \frac{\varepsilon \varepsilon_0 A V}{d} \quad (1)$$

of FIGS. 1a-1e. In general, a colorant of high capacitance (high q/V) will hold its charge longer for a given current leakage resistance R (larger RC leakage constant).

A more detailed explanation of FIGS. 1a-1e will now be given in light of the current molecular switch example with reference to FIGS. 2a-2d. FIGS. 2a-2d depict a molecule 200 having a rotor portion 202 between two stator portions 204, 206. The rotor portion 202 is provided with a dipole moment, arising from the presence of an electron acceptor group 202a and an electron donor group 202b on the rotor portion 202 of the molecule 200.

An example of the molecule 200 is provided below, in which Formula (a) is shown in the fully-conjugated position, wherein the middle rotor (R) ring is in the same plane as the two outer stator (S) rings (here, the plane of the paper). Formula (b) is shown in the deconjugated state, wherein the middle rotor (R) ring is rotated out of the plane of the two outer stator (S) rings. The rotor ring R has an electron acceptor group A and an electron donor group D thereon.

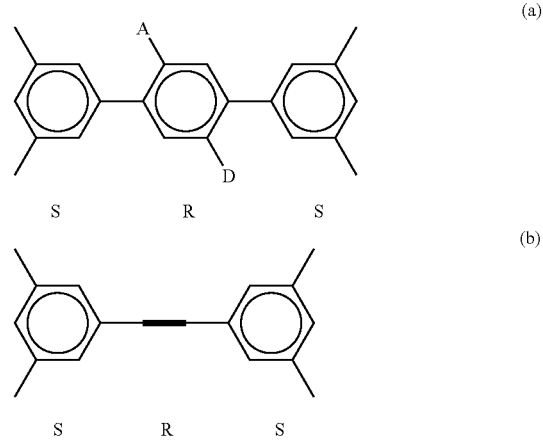

As used herein, the rotation may or may not be a full 90°, as shown here, which illustrates the extreme case. In the design of the molecule, there is a steric hindrance or repulsion that may prevent the rotor R from rotating through a complete 180 degree half cycle: Instead, the rotation is halted by the steric interaction of bulky groups on the rotor and stators at an electrically significant angle of typically between 10° and 170° from the initial orientation. For the purposes of illustration, this angle is shown as 90° in the present application. Furthermore, this switching orientation may be stabilized by a different set of inter- and/or intra-molecular hydrogen bonds or dipole interactions, and is thus latched in place even after the applied field is turned off. The molecule is reversibly switchable between the two states. Further details of this type of rotor-stator interaction are provided in U.S. Pat. No. 6,674,932, issued on Jan. 6, 2004, to Xiao-An Zhang et al and assigned to the same assignee as the present application. The contents of that patent are incorporated herein by reference. In many cases, the rotor free rotates in the absence of an e-field providing a time averaged conjugation. In this instance, the field typically stops the rotation to a color off state.

As a further elaboration, when the rotor R and stator S are completely coplanar, then the molecule is fully conjugated, and when the rotor R is rotated at an angle of 90° with respect to the stators S, then the molecule is non-conjugated, or deconjugated. However, due to thermal fluctuations, these ideal states are not fully realized, and the molecule is thus referred to as being "more conjugated" in the former case and "less conjugated" in the latter case.

In the more-conjugated state (Formula (a)), the non-bonding electrons, or π-electrons, or π-electrons and non-bonding electrons of the molecule, through its highest occupied molecular orbital (HOMO) and lowest unoccupied molecular orbital (LUMO), are delocalized over a large portion of the molecule, and molecule evidences color in the visible spectrum. This is referred to as a "red-shifted" for the molecule, or "optical state I".

In the case where the rotor R is rotated out of conjugation by approximately 10° to 170° with respect to the stators S (Formula (b)), the conjugation of the molecule is broken (altered or changed) and the HOMO and LUMO are localized over smaller portions of the molecule, referred to as "less-conjugated", and the molecule is transparent in the visible spectrum. This is a "blue-shifted state" of the molecule, or "optical state II". The terms "red-shifted" and "blue-shifted" are not meant to convey any relationship to hue, but rather the direction in the electromagnetic energy spectrum of the energy shift of the gap between the HOMO and LUMO states.

The molecule above is seen to have two functional groups, an electron acceptor (A) and an electron donor (D). Together, these two functional groups provide a dipole moment to the molecule, as well as providing the steric hindrance against a full 180° rotation. The molecule is intended to be merely exemplary of the type of switching behavior discussed herein, and other molecules may be readily constructed by those skilled in the art that will accomplish the same purpose; see, e.g., U.S. Pat. Nos. 6,822,893, 6,751,365, 6,795,230, 6,805,817, 6,701,035, 6,674,932, 6,920,260, 6,888,978, 6,867,427 and 6,934,424, the contents of which are incorporated by reference herein, which disclose examples of such compounds.

In FIGS. 1a and 2a, the rotor 202 and stators 204, 206 are planar and exhibit a colored switch state. The planes are preferably assembled parallel to the substrate so that the rotor dipoles 202a, 202b are also oriented in plane and parallel to the substrate.

Figure 2B:
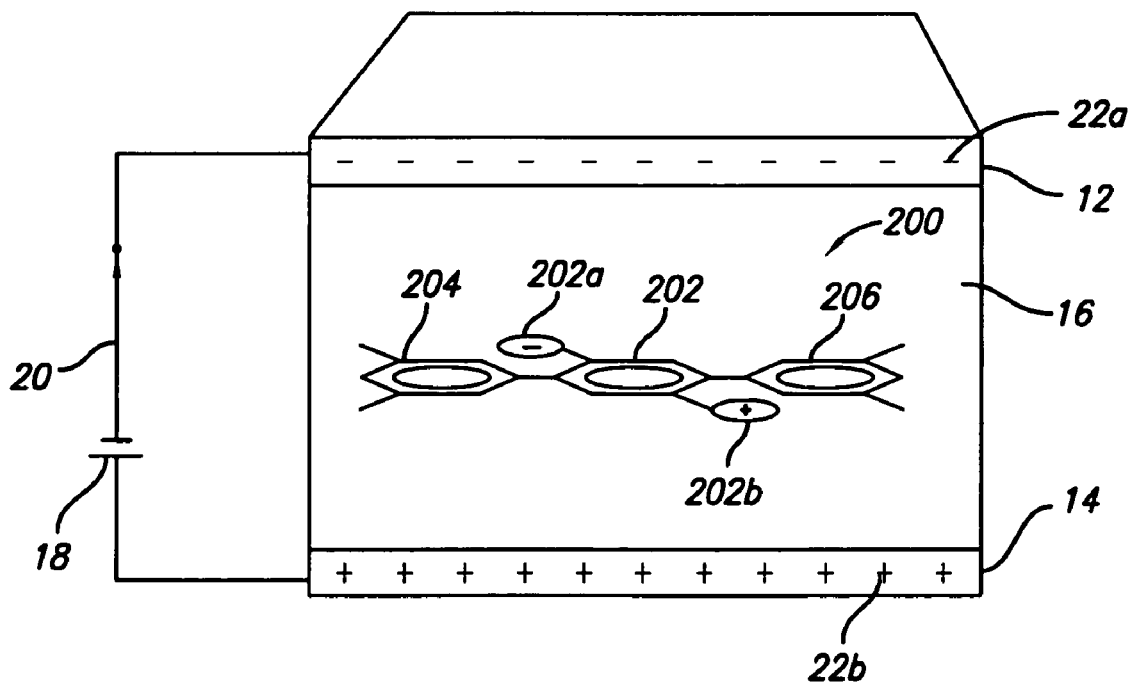

An electric field is developed across the colorant via separated charges when a first switching voltage is applied across the electrodes 12, 14, as shown in FIGS. 1b and 2b.

Figure 2C:
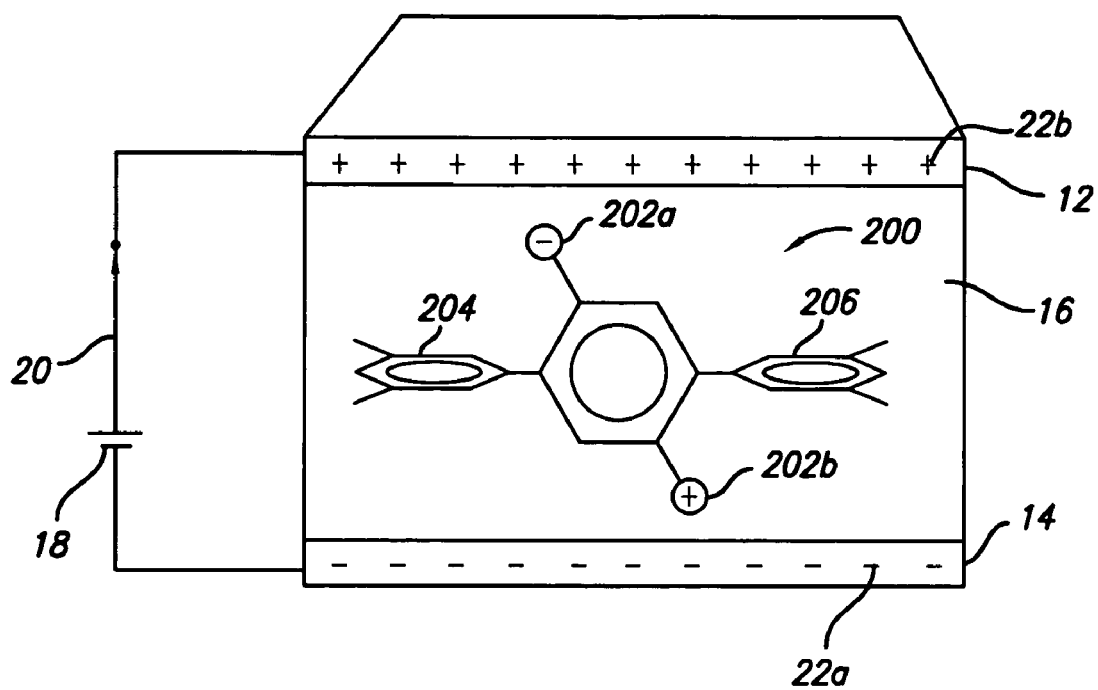

The rotor dipoles 202a, 202b in the colorant layer create a rotor torque within the field sufficient in energy to rotate the rotors 202 out of plane and into the higher conformational energy deconjugated rotor-stator state, as shown in FIG. 2c.

As the rotors align with the electric field, they create a counter field. The counter field creates a holding force on the separated charges that allows the voltage source 18 to add charge (not shown) to the electrodes 12, 14. The increase in charge continues until all rotor dipoles 202 are aligned and, consequently, the colorant layer within the field is fully changed to its non-colored transparent state. It may be appreciated that a similar, and probably smaller, polarization may occur in the surrounding dielectric film, if any, that holds the dye molecules.

Figure 2D:
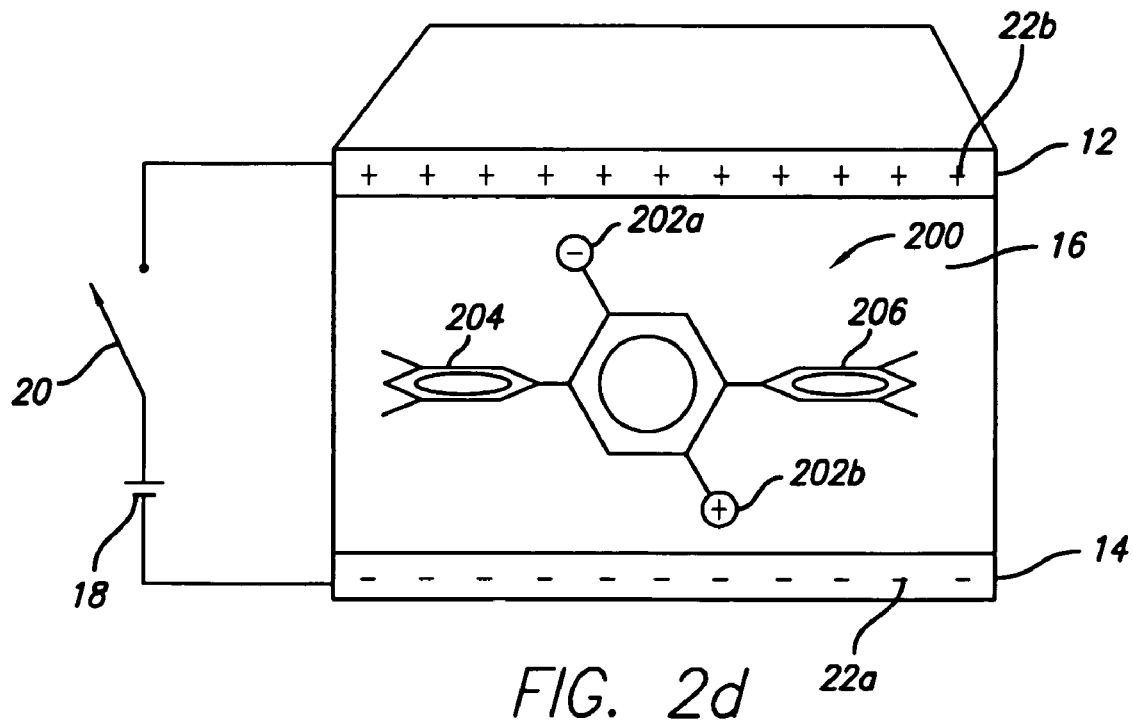

When the voltage source 18 is switched off, as depicted in FIGS. 1c and 2d, the dipole-induced counter field and separated charges on the electrodes 12, 14 remain in equilibrium, holding the non-colored transparent state of the colorant. That is, the field created by the separated charges is sufficient to prevent the rotors 202 from returning to their lower conformational energy planar rotor-stator state. Likewise, the counter field created by the aligned dipoles 202a, 202b is sufficient to hold the charges in separation.

The second switch state remains stable until the separated charges either recombine through current leakage paths within the switch circuit or a counter voltage is applied to force recombination. In the former case, the holding field created by the separated charges weakens, allowing the rotors 202 to gradually relax until conjugation is reinstated. In the second case, illustrated in FIG. 1d, the voltage source 18 applied to the electrodes 12, 14 is reversed in polarity to sufficiently nullify or partially reverse the polarity of charges on the electrodes to allow rotation of the rotors 202 back to their conjugated planar rotor-stator state. The magnitude and duration of the reverse voltage is selected to assure that the rotors 202 do not appreciably rotate past the planar state.

When planar, the colorant changes back to its colored, conformationally preferred state. This color state remains stable in the absence of an applied voltage, as shown in FIG. 1e. It is worth noting that in some rotor-stator configurations, the color state occurs through free rotation of the rotor (the eye integrates the nanosecond cycles of colored/non-colored rotor orientations). On the other hand, some embodiments may employ chemically hindered structures that prevent such rotation and hold the rotor to conjugated and non-conjugated resting states.

In the present device, the field-induced rotation of the molecular switch rotor dipoles works identically to the general alignment of dipoles in the di-electric layer of a charge storage capacitor. In both cases, the concentration of di-poles that can be aligned or induced in the field determines the dielectric constant of the dielectric layer. The charge that is ultimately developed and stored on the electrodes is proportional to the dielectric constant (as shown in Eqn. (1) above). Unlike the general case of a conventional capacitor dielectric, however, the capacitor dielectric of the present invention changes in molecular switch state (e.g., color, refractive index, electrical conductivity) as a result of field alignment.

Figure 3:
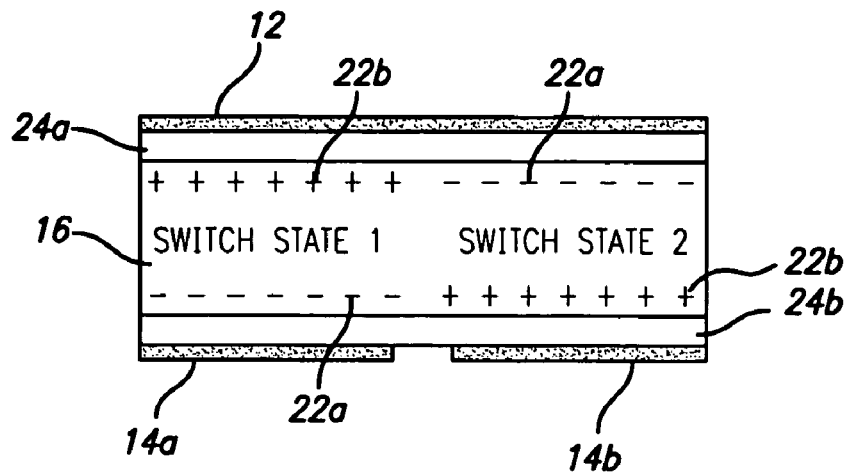
FIG. 3 is a cross-sectional view, depicting another embodiment of the charge storage capacitor in which an electrical resistance layer is added to one or both sides of the switch layer.

FIG. 3 shows another embodiment of the present invention. In this instance, an electrical resistance layer 24a, 24b is added to one or both sides of the colorant layer 16 as shown. The purpose of the resistance layer(s) 24a, 24b is to retard the leakage of current between pixel cells sharing common cross-bar electrodes in a passive matrix display device. A common electrode 12 is provided on one side of the colorant layer 16. Two drive electrodes 14a, 14b are provided on the opposite side of the colorant layer 16, which create two cells within the colorant layer.

In one embodiment, the resistance layer(s) 24a, 24b are of high di-electric constant and high electrical resistance. Less expensive organic layers will have dielectric constants of around 4.0 to 6.0. Such organic layers may comprise polyurethanes, polyacrylonitriles, polar elastomers (e.g., polychloroprene), etc. These materials are commonly known to be non-conductors. Other materials may include high dielectric constant additives or may comprise organo-metallic materials. A white coating, for example, might include titanium dioxide (dielectric constant =100), also a non-conductor. It will be appreciated that the purpose of the high di-electric constant materials can be achieved by association with only one electrode, since the capacitor resistance is defined by a series of resistances defined by each layer. A high resistance in any one layer prevents charge injection through the capacitor. When using a titanium dioxide white background layer for a display, the $TiO_2$ would need to be on the electrode furthest from the observer, while the front electrode remained transparent.

In another embodiment, the resistance layer dielectric constant is sufficiently high to prevent significant voltage drop across the resistance layer(s) 24a, 24b. Materials meeting these requirements are well known in the coatings art and include high dielectric constant polymers and ceramics.

Figure 4:
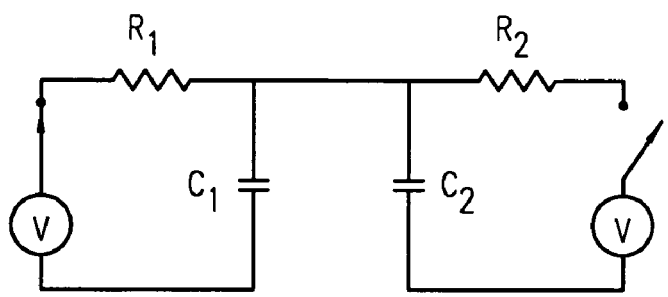
FIG. 4 depicts the charging circuit schematic diagram for switching one of two cells on a common electrode.

FIG. 4 shows a schematic representation of the charging circuit for switching one of two cells on a common electrode 12. The charge developed per time t is given in the common RC circuit equation:

$$q = CV(1 - e^{-1/RC}) \quad (2)$$

In FIG. 4, $R_1$ is the sum of electrical resistances in the circuit that charge the colorant pixel cell, represented electrically as capacitance $C_1$. The RC constant should be made small to allow rapid switching times. One skilled in analog electronics will be able to determine this as a part of a particular design. As a pixel gets smaller, so does its capacitance C for a given colorant layer. The resistance is determined by the length, cross-section and conductivity of the crossbar electrodes that are selected and that charge the capacitor cell. Because the molecular switch has an infinitesimal inherent switching time, the switching time of the pixel is virtually completely determined by the pixel capacitance and crossbar resistance (RC constant). The switching time statement may want to refer to a desired switching time for a particular application, as determined by one skilled in the analog electronics art. In an embodiment, color switch cells having a capacitance of 1 femtofarad ($10^{-15}$ farad) are representative for a 25 μm×25 μm pixel (not including circuit stray capacitance), such as depicted in FIGS. 1a-1e.

Figure 5:
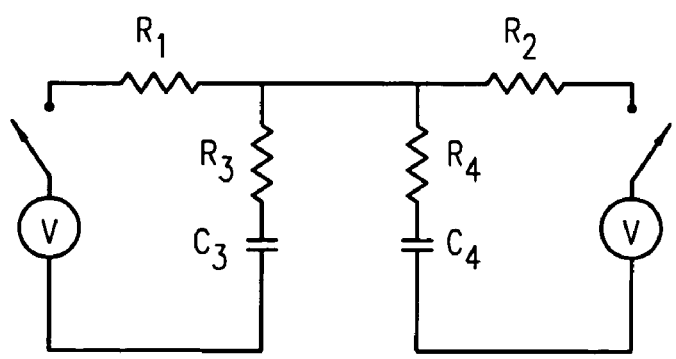
FIG. 5 depicts the stable state circuit schematic diagram for the two charged pixel cells shown in FIG. 3.

FIGS. 4 and 5 show different electrical switch states for driving such a pair of cells. In FIG. 5, the resistance layers, shown electrically as $R_3$ and $R_4$, retard the flow of stabilizing charge from the capacitors. The RC circuits for both charging and discharging the pixel capacitor should be designed to provide adequate switch and hold times for a given passive matrix addressed display application. It is noted here that the source voltage for switching may be set higher than that required to change a switch state. In the case of rotor-stator colorants, a rotor may be held at any angle greater than required for deconjugation (typically 30° to 45° from plane), indicating that short of dielectric breakdown, higher switching voltages are acceptable and allow faster switch times (per given charging equation). Such higher voltages could be problematic for Coulombic latches, since greater rotor rotation creates stronger Coulomb latches.

The present teachings are particularly well suited for passive matrix, grayscale, full motion video displays. The competitive benefits of such passive matrixing are described elsewhere and include lower manufacturing cost and display power requirement. There are many matrix drive schemes that may be employed to address the pixels of the present invention and that are known in the display art. These generally control the sequence and timing of pixel addressing.

A representative drive scheme shall be described herein by way of example. In one embodiment, the row and column crossbar electrodes (not shown) are electrically energized by row and column drive circuits. These drivers sequence voltage signals along the row and column electrodes to address each pixel at the electrode intersections. The voltage applied across a given electrode intersection may be controlled in both magnitude and polarity to provide rotor deconjugation and relaxation.

In a simple scheme, the array of pixels is addressed through a nested loop in which column electrodes, for example, are driven in a repeated sequence of column electrode 1 through n while the row electrode is indexed at the end of each column sequence from row electrode 1 through m. In this scheme, the pixels in each row are addressed in sequence, then the next row pixels are addressed in sequence, and so forth until all pixels in all rows have been addressed. Due to the infinitesimal switching time required to address each pixel, the entire array of pixels within a display can generally be addressed within a fraction of the time allotted for a given video frame. This allows the array to be fully addressed a multiple number of sub-frame times during the period of any frame.

If the drive circuit impedance allows the array to be addressed p times within a frame period, then the display can provide p+1 levels of grayscale. In this case, a given pixel may be switched to a second state, then switched back to a first state during the span of any of the 1 through p sub-frame scans. A display comprising a black colorant layer on a white reflective substrate with a drive circuit capable of addressing 15 sub-frames per frame, for example, produces 16 levels of gray. An unswitched pixel appears black. A pixel switched transparent for all p sub-frame periods appears white. Intermediate graylevels are produced in proportion to the number of sub-frames that the pixel is held black verses switched white.

The teachings herein have been described above in terms of a color switch. Other aforementioned switch states, such as refractive index and electrical conductivity states, are equally applicable to the charge storage capacitor bi-stability scheme. Likewise, molecular switch addressing has been described in terms of fixed electrodes that bound a colorant layer. It should be recognized by one skilled in the art that the molecular switch of the present invention does not require attached or fixed electrodes. An electrode or electrodes that pass relative to the surface of the molecular switch may alternately address it. Such electrodes are generally described in, for example, the following references: U.S. Pat. No. 5,866,284, issued Feb. 2, 1999, entitled "Print Method and Apparatus for Re-Writable Medium", to Kent D. Vincent; application Ser. No. 09/978,384, filed Oct. 16, 2001, entitled "Portable Electronic Reading Apparatus", by Kent D. Vincent et al; and application Ser. No. 10/658,217, filed Sep. 9, 2003, entitled "Method and Apparatus for Electro-Optical Disk Memory", by Kent D. Vincent et al. The contents of the foregoing cited references are incorporated herein by reference. Such electrodes in combination with the present simplified bi-stable molecular switch scheme may be ideal for applications such as electronic books and re-writabe paper. In the latter case, the present capacitive charge scheme is designed into the media.

The following advantages and further embodiments are provided by the teachings herein:

(a) The molecular switch dipole is used to obtain switch bi-stability, wherein the switch electrodes and a dielectric layer containing the molecular switch form a charge storage capacitor.

(b) A charge storage capacitor is provided wherein the molecular switch principally forms a dielectric layer and is positioned within the electric field produced by a pair of electrodes.

(c) Switch bi-stability is obtained by a change in the molecular dipole vector (dipole alignment/magnitude) in response to the field wherein the change creates a stabilizing counter field.

(d) A bi-stable crossbar molecular switch array is provided, having a resistance layer or layers that retard leakage current from the switch capacitor cell.

(e) A passive matrix addressed display is enabled by the fast switching speed and present bi-stability means.

(f) Time-modulated grayscale and full motion video imaging are enabled by the present bi-stability means.

(g) A bi-stable rewritable media (e.g., paper, mass storage, etc.) is enabled by the present bi-stability means.

(h) An electronic book or printer is provided in combination with the bi-stable rewritable media of the present invention.

(i) A bi-stable memory device is provided comprising a crossbar electrode structure and present bi-stable molecular switch.

(j) A bi-stable logic device is provided comprising a crossbar electrode structure and present bi-stable molecular switch.

B. Capacitive Latched Bi-Stable Polarization-Type Molecular Switch (Charge Separation)

The foregoing embodiment describes a novel capacitive latch mechanism that provides molecular switch bi-stability in a display, other electronic circuit or device, electronic paper or related media that incorporates the novel and enabling molecular switch. Such a capacitive latch offers significant advantage in display power requirement, by eliminating a hold voltage requirement and enables pixel bi-stability required of electronic paper. In that latch mechanism, a dipolar moiety within a molecule is capable of switching between two states. Application or reversal of an applied electric field causes the dipolar moiety in each molecule to align with the field.

In the present embodiment, a dipolar molecule having the dipolar charge separated by the length of the molecule is provided. Here, the molecules themselves align with the application of the electric field. It will be appreciated that switching can occur through any dimension of a molecule, depending on its design, and not just its length dimension. In many cases, it is desirable that the switch axis be designed orthogonal to the length of the molecule to allow the field axis and optical axis of the molecule to be orthogonal (to avoid dichroism).

Figure 6A:
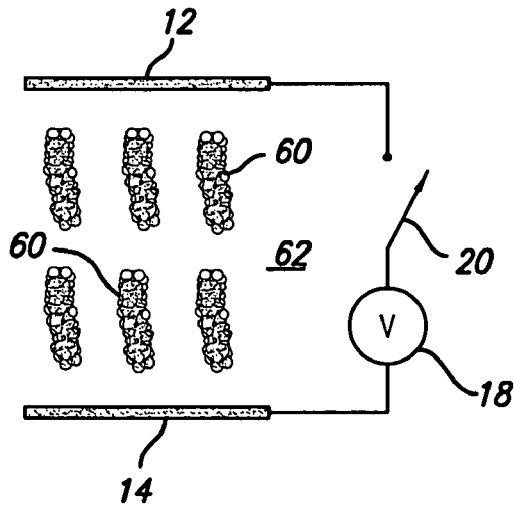
FIGS. 6a-6d depict the effect of the presence or absence of an electric field on six molecules in an alternate embodiment.
Figure 6B:
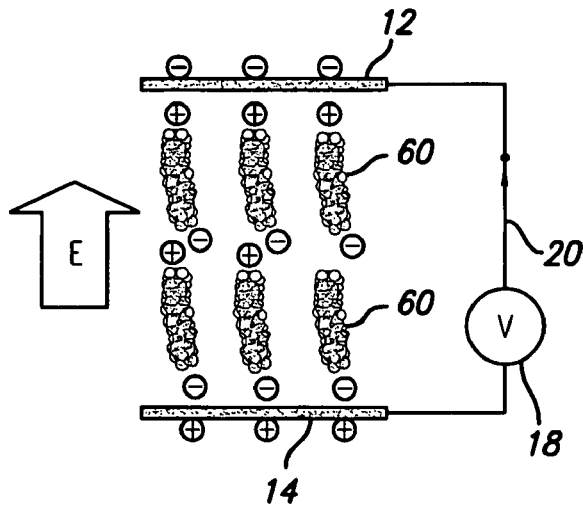
Figure 6C:
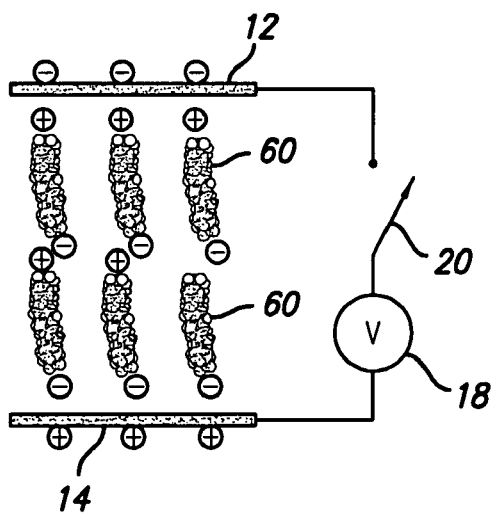

The capacitive latch described in the previous embodiment has been described in terms of a rotor-stator-type molecular switch. The latching scheme with respect to the polarization-type molecular switch is different from that of the rotor-stator switch. Referring now to FIGS. 6a-6c, the polarization molecules 60 (shown as space-filled representations) are pre-aligned in a polymer film 62, for example, by holding an electric field across the polymer during a polymer solidification process. Alternatively, the polarization molecules 60 may be aligned and form as a film on its own via self-polymerization, hot melt or volatile solvent solution. In the presence of an electric field, each polarization molecule 60 develops a strong dipole alignment with the field, thus aligning the polarization molecules. The polymer film 62 is sandwiched between electrodes 12, 14, and an electric field is applied by voltage source 18 and controlled by ON-OFF switch 20.

The polarization molecules 60, as noted above, comprise an acceptor portion at one end of the molecule and a donor portion at the other end of the molecule. Examples of such molecules are depicted in application Ser. No. 10/945,576, filed Sep. 21, 2004 (U.S. Patent Publication No. 2006/0060836 A1, published Mar. 23, 2006).

In the absence of an electric field, as shown in FIG. 6a, the polarization molecules are transparent.

When a voltage is applied to the electrodes 12, 14, as shown in FIG. 6b, an electric field E is developed across the polymer film 62, causing a charge separation in the polarization molecules 60 that transforms the molecules to their colored state. The charge separation creates molecular dipoles and a consequent electric field within the polymer film 62 that is countered by the charge collected on the electrodes 12, 14. The effect is common to that in the dielectric layer of a charge storage capacitor.

When the voltage source is switched off, as shown in FIG. 6c, the separated charges of the polarization molecules 60 and counter balancing charges on the electrodes 12, 14 remain latched (as with charge storage state of a charge storage capacitor). This creates a stable colored state in the absence of an applied voltage.

Figure 6D:
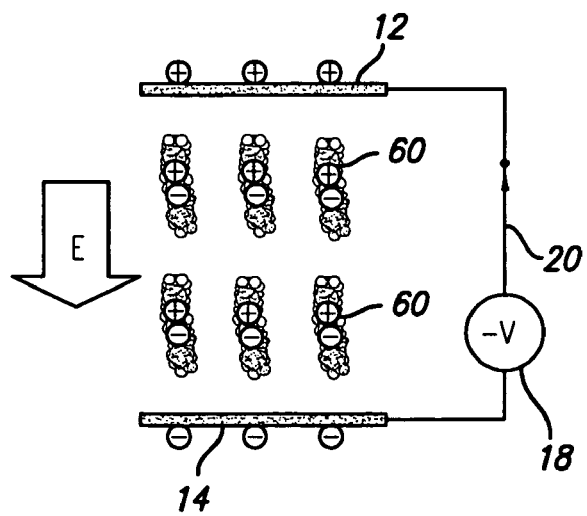

This state remains in the absence of electrode leakage current until a reverse bias is applied across the electrodes, as shown in FIG. 6d. The reverse bias creates an electric field that recombines the separated charges on the polarization molecules, transforming the molecules back to their transparent state.

When the applied reverse bias is removed (return to FIG. 6a), the polarization molecules 60 assume their original stable transparent state. Thus, in a manner analogous to the relatively stable charged and discharged states in a common charge storage capacitor, the polarization molecule may be switched between two stable color states.

In some applications, the external fields imposed across the polarization molecules 60 will be produced with an electrode or electrodes 12, 14 that are not fixed in position with respect to the film containing the polarization molecules. The color states may be switched, for example, with an electrode or electrode array that translates across the surface of the film. A similar counter field latching mechanism can occur in the absence of fixed electrodes (fixed to the film containing the polarization molecules). The latch is similarly released with an external reverse bias that recombines the ions in each molecule. Such bi-stability relative to transitory electrodes enables application of the polarization molecule to the addressable colorant in electronic paper and books.

C. Examples of Suitable E-Field Polarizable Materials (Charge Separation)

A number of examples of structures and mechanisms suitably employed in the practice of the present invention are given in application Ser. No. 10/945,756, filed Sep. 21, 2004 (U.S. Publication No. 2006/0060836 A1, published Mar. 23, 2006). The molecules depicted therein are polarized under an applied electric field, and turns molecules into active electronic and/or optical devices that can switch on and off under the influence of an external electric field.

The molecules are designed to have three segments or units, namely, donor/switchable bridge/acceptor or D-B-A that are integrated into the structure of a chromophore. In some embodiments, the middle bridging segment may be a twisted conjugated system that can be switched on or off using an external E-field to electrically connect or disconnect the donor and acceptor to each other. In other embodiments, the bridging unit is a tautomer that is capable of switching between a conjugated and a non-conjugated state. Both donor and acceptor units comprise aromatic ring systems with at least one electron donating or electron-accepting atom (or atomic group) in the ring or attached directly to it. The middle-bridging segment can also be a conjugated system with twisted aromatic rings at its both ends. The ending aromatic rings of the middle bridging unit can either be connected through a tautomerizable unit and then to the donor and acceptor or be connected directly to the aromatic rings of both donor and acceptor units through sigma bonds, and forms two sets of bi-phenyl types of adjacent aromatic system (BPA).

When the molecule is in a non-polarized state, the two adjacent aromatic rings of the BPA system will tend to stay in twisted conformation instead of co-planar because of the repulsive forces between hydrogen atoms on the two adjacent aromatic rings. The electronic communication between donor and acceptor units is cut off, and there will be either no charge transfer or little charge transfer between donor and acceptor groups due to the non-planar conformation. The molecule has a large HOMO/LUMO band gap and a smaller dipole. The molecule is essentially an insulator, and its optical absorption in this state is in the region of short wavelength by comparison with its polarized state.

However, when an external E-field with the appropriate orientation is applied, the molecule will polarize to align with the direction of the external E-field. In order to reach its maximum polarization, that is to reach its maximum p-$\pi$ delocalization state, the ring system of the middle segment must be coplanar with the ring systems of donor and acceptor. Direct charge transfers between the donor and acceptor and a large dipole will result during this process. The p-$\pi$ electrons of all segments of the molecule (D-B-A) will delocalize throughout the entire system, and form a highly conductive state with a much smaller band gap. The optical absorption of the molecule is red-shifted. Some of the molecule is designed with tautomerizable functional group(s) in order to achieve larger change between the on and off states. The electronic state of the molecule is stable with or without the external E-field once it is switched.

When an oppositely directed external E-field is applied, electrostatic repulsion between the external E-field and the localized E-field from the polarized molecular dipole forces the molecule to rearrange conformationally to minimize charges repulsion, and minimize the potential energy build-up due to the incompatibility between the two. The adjacent aromatic rings within the segments of the D-B-A system start to twist in certain angles, and form a non-planar conformation. Structural tautomerization of the molecule will occur also with some of the tautomerizable molecules during the process. Both rings twisting and structural tautomerization of the molecule at this point will tend to minimize the polarization of the molecule and reduce or eliminate the charge transfer between the donor and acceptor ends. The electronic communication between donor and acceptor units is once again cut off, and there is no or little charge transfer between the donor and acceptor. The p- and $\pi$-electrons of the molecule will be localized within each fragment, instead of delocalized throughout the entire molecular system. The optical absorption of the molecule is thereby blue shifted. For the reasons mentioned above, the molecule is also stable in this highly localized insulating state.

It is worth noting that the molecular materials can also undergo large dipole changes under the influence of an electromagnetic field. The materials have similar response as they do under an external E-field when they exposed to a polarized light. The materials can also be used for optical computing and optical signal processing, since the large change in the dipole moment of the materials will usually lead to a large bulk second and/or third order nonlinear optical property.

The molecular materials can be used as either monolayer or multiple layers in the capacitive latch described above. The monolayer can be prepared through a Langmuir-Blodgett method or a self-assembly. The multilayer can be prepared either through a layer-by-layer 3-D assembly, or one of conventional thin film preparation methods, such as thermoevaporation, chemical evaporation, or spin coating, etc. The molecular materials can be used as either sole material for the device or blended with other molecular or polymeric materials. For example, the molecular material may be placed in a liquid polymer and electrically aligned prior to solidification of the polymer.

A typical procedure for thin film preparation is as follows: The thin films of the switchable molecular material in polyethylene are prepared by spin coating onto indium tin oxide (ITO) coated glass; then a semi-transparent layer of gold is deposited on the film. The gold and the ITO layers act as electrodes for poling. The film is heated above its glass transition temperature. In the rubbery state of the polymer, molecular motion is enhanced. Next, a strong electric field is applied to the sample that tends to align the molecules. The sample is cooled and the electric field removed. The induced polarization is then locked in, resulting in a non-centrosymmetric (asymmetric) material.

For example, Scheme I below depicts the various transformations of molecule 1 as it experiences a substantial change in both molecular dipole and band gap as well as in spectrum absorption during an electric field induced polarization process.

Scheme I

Molecule 1

Figure 7A:
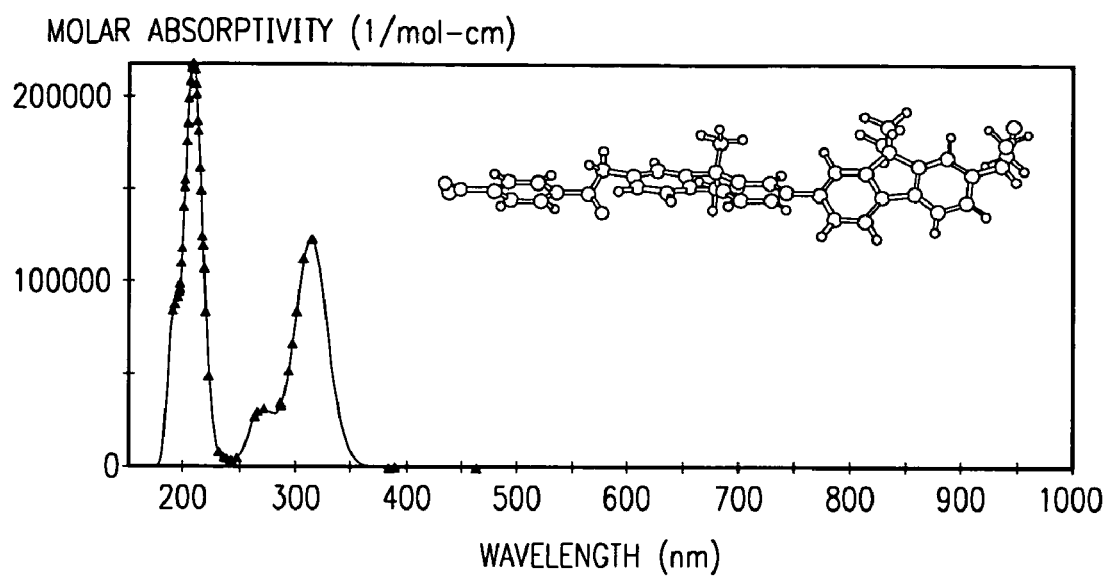
FIGS. 7a-7b, on coordinates of molar absorptivity (in 1/mol-cm) and wavelength (in nm), are plots depicting the optical absorption change of a molecule during the electric field induced molecular polarization along with molecular tautomerization.
Figure 7B:
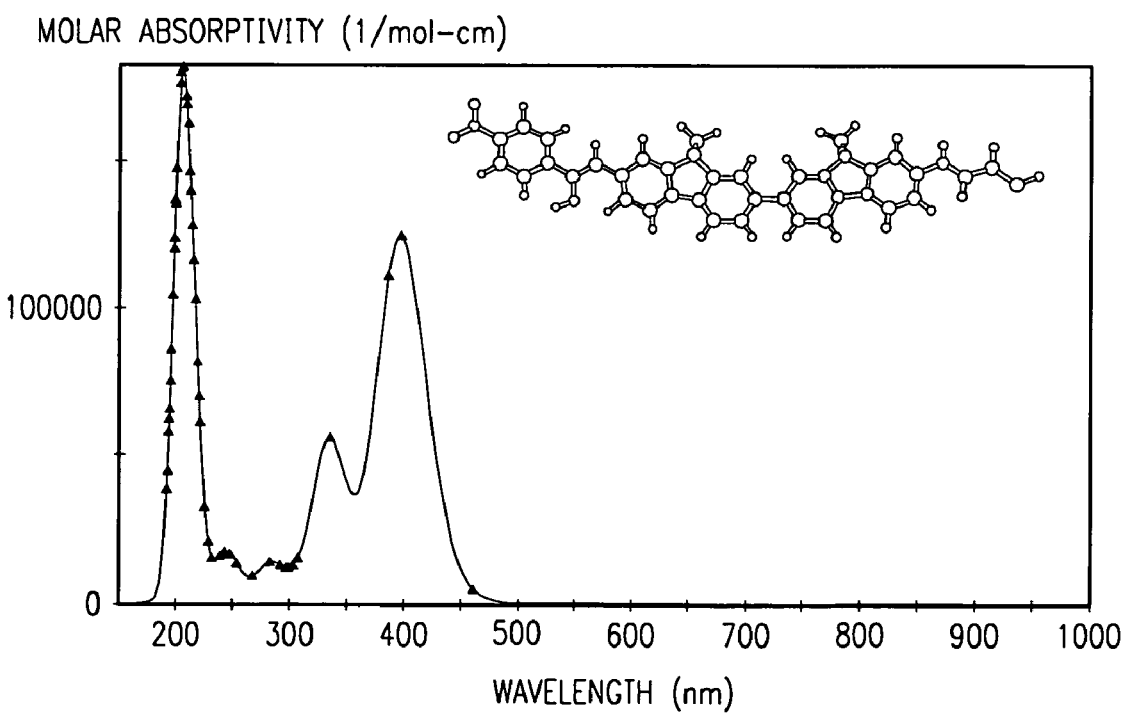

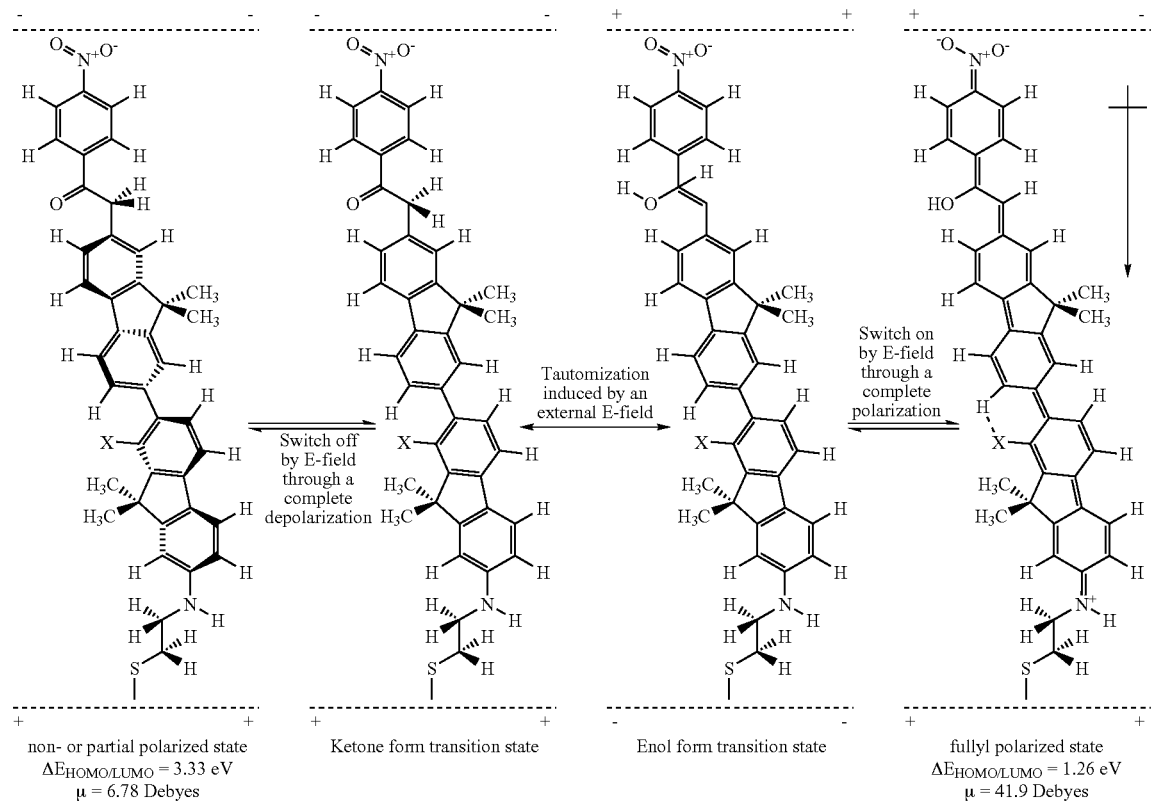

non- or partial polarized state
$\Delta E_{HOMO/LUMO} = 3.33$ eV
$\mu = 6.78$ Debyes Ketone form transition state Enol form transition state fullyl polarized state
$\Delta E_{HOMO/LUMO} = 1.26$ eV
$\mu = 41.9$ Debyes The foregoing Scheme I depicts an E-field induced molecular polarization along with molecular tautomerization. FIGS. 7a-7b depict the optical absorption change of the molecule 1 during the E-field induced molecular polarization along with molecular tautomerization. FIG. 7a depicts the optical absorption of the molecule in the non- or partial polarized state, while FIG. 7b depicts the optical absorption of the molecule in the fully polarized state.

From Scheme I, it can be seen that the molecule 1 is constructed with an electron-donating group (HS—CH$_2$CH$_3$NH—), an electron-accepting group (-PhNO$_2$, where Ph is the phenyl group) along with a middle-bridging segment. The middle-bridging segment is a direct-link of two fluorene groups. The electron-donating group (HS—CH$_2$CH$_3$NH—) is attached directly to one end of the bi-fluorene segment, and the electron-accepting group (-PhNO$_2$) is linked with another end of the bi-fluorene segment with a tautomerizable ketone (—CH$_2$CO—) group.

The characteristic of the bi-fluorene segment is very similar with the bi-phenyl types of adjacent aromatic system (BPA). When the molecule 1 is in a non-polarized state, the tautomerizable group of the molecule will tend to stay in ketone form (—CH$_2$CO—), and the bi-fluorene rings of the middle segments will tend to stay in a twisted conformation (ca 31° angle between the two fluorene rings) because of the repulsive forces between hydrogen atoms on the two adjacent aromatic rings of the BPA system. The electronic communication between donor and acceptor units is cut off by both the twisted nonplanar aromatic system and the ketone form of molecular structure. The molecule has a small dipole ($\mu$=6.78 Debye) and large band gap ($\Delta E_{HOMO/LUMO}$=3.33 eV), which corresponds to an optical absorption at $\lambda$=372 nm. The molecule is essentially an electrical insulator and optically transparent material in visible range.

However, when an external E-field with the appropriate orientation is applied, the molecule will tend to polarize in the direction of the external E-field. In order to reach its maximum polarization, that is to reach its maximum p-π delocalization state, the bi-fluorene transforms into coplanar conformation along with a structural tautomerization of a ketone to enol. This results in a fully polarized state with a large dipole ($\mu$=41.9 Debye). Consequently, the molecular band gap is decreased dramatically ($\Delta E_{HOMO/LUMO}$=1.26 eV). Both electrical conductivity and optical properties are substantially changed.

When an oppositely directed external E-field is applied, electrostatic repulsion between the external E-field and the polarized molecular dipole forces the molecule 1 to rearrange both structurally and conformationally. To minimize charge repulsion and minimize the potential energy build-up due to the incompatibility between the two, the segments of the bi-fluorene system will start to twist (ca 31° angle) on the single bond between the two fluorene-rings, and at the same time, undergo structural re-tautomization from enol to ketone. Both structural and conformational rearrangements will completely cut off the channel between the donor and the acceptor. The electronic communication between donor and acceptor units is once again cut off, and there is no more electronic delocalization through the entire molecular system. The optical absorption is blue shifted greatly, and the molecule is in this highly localized insulating state.

From Scheme I, it can be seen that the molecule 1 undergoes a large spectrum change of optical absorption during the E-field induced the polarization or de-polarization process.

The spectrum change of the optical absorption is greater than 80 nm.

Another example of the enol-ketone tautomerization is given in Scheme II below.

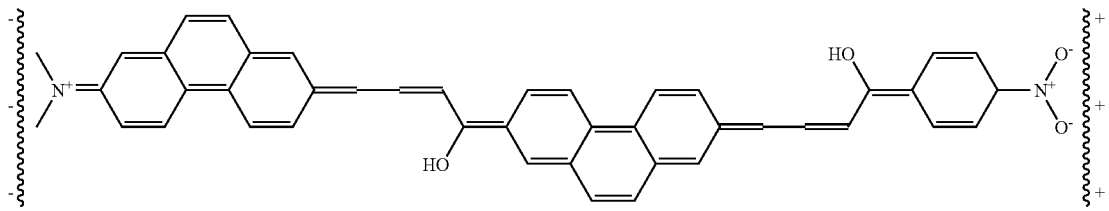

polarized state (enol structure)

E-field or electromagnetic field ↕ Reversed e-field or electromagnetic field

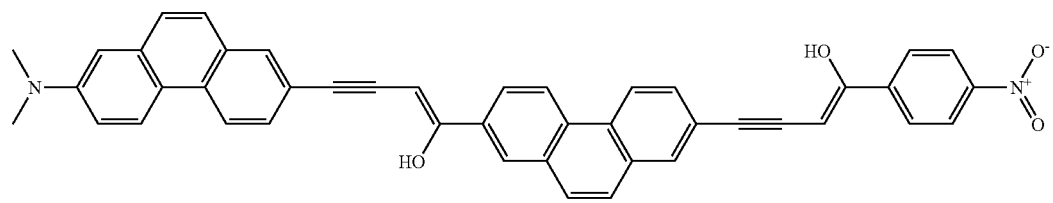

transition state (enol structure)

E-field or electromagnetic field ↕ Reversed e-field or electromagnetic field

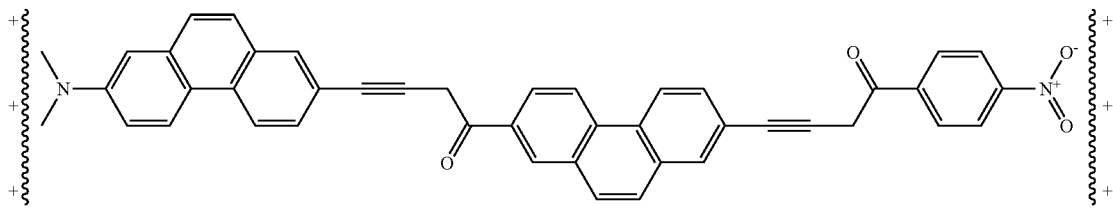

non-polarized state (enol structure)

The non-polarized state (ketone structure) reversibly goes through a transition state to a polarized state (enol structure). In the non-polarized state, the molecule has a relatively smaller dipole and a relatively larger band gap, while in the polarized state, the molecule has a relatively larger dipole and a relatively smaller band gap.

Some embodiments of molecules suitably employed in the practice of the various embodiments of the invention follow a generic pattern depicted below, namely, bi-phenyl rotation. However, this is simply one of several switching methods. In general, the polarization switch involves a tautomerism (e.g., keto-enol). Generally, the tautomer forms include the creation or reduction of a conjugating double bond. In the keto-enol tautomer, the pi ($\pi$) electrons for the C=C double bond are obtained from the C=O double bond.

The electron donor unit may be one of following: hydrogen, amine, OH, SH, ether, hydrocarbon (either saturated or unsaturated), or substituted hydrocarbon or functional group with at least one of hetero-atom (e.g., B, Si, I, N, O, S, P). The donor is differentiated from the acceptor by that fact that it is less electronegative, or more electropositive, than the acceptor group on the molecule.

The middle bridging segment is a conjugated system containing one or more switchable bi-ring systems (two adjacent aromatic rings of the BPA type of system) that can be switched on and off to connect or disconnect the both donor and acceptor by an external E-field. It will be appreciated, however, that the bi-ring system is but one example. It is not necessary, nor preferred, to have a

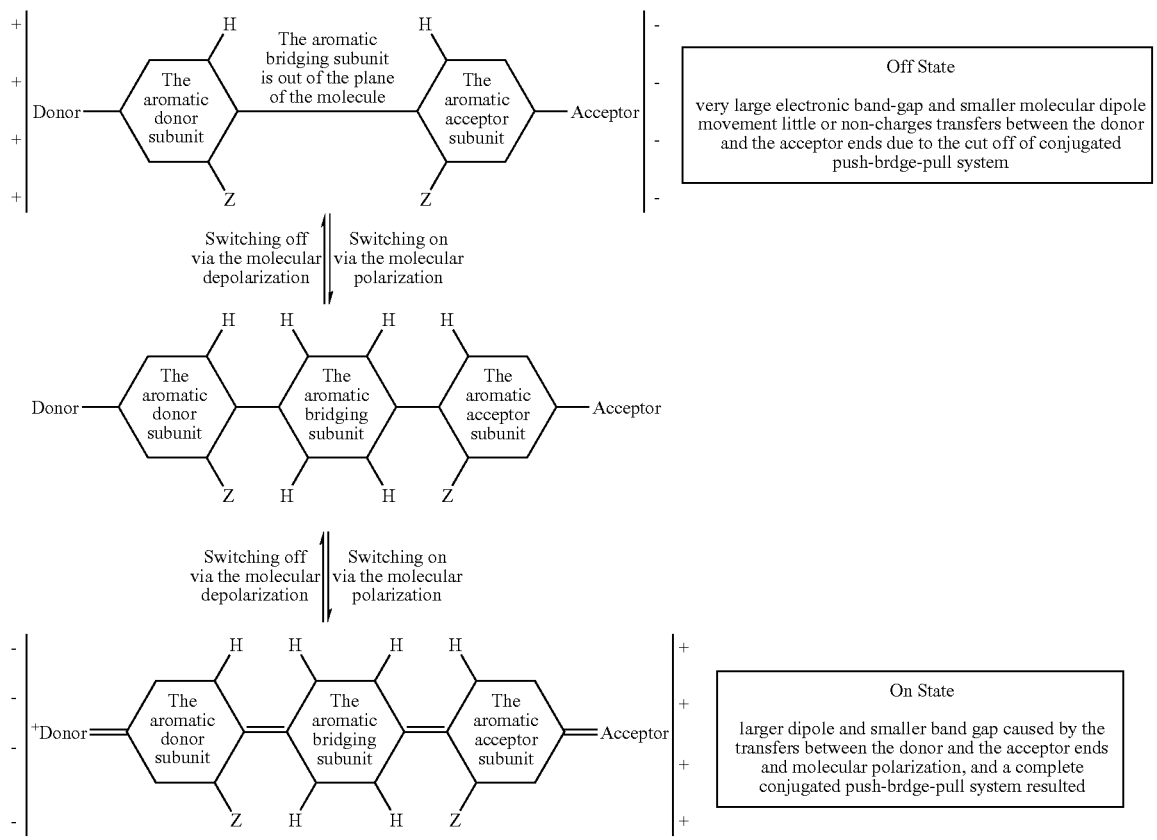

The molecular systems employed in the capacitive latch of the invention may have at least one of the following features:

- The molecule can be separated into donor unit, acceptor unit and switchable middle bridge unit.
- Both the donor and acceptor units comprise aromatic ring systems with at least one electron donating or electron-accepting atom (or atomic group) in the ring or attached on it directly.
- The electron acceptor unit may be one of following: carboxylic acid or its derivatives, sulfuric acid or its derivatives, phosphoric acid or its derivatives, nitro, nitrile, hetero atoms (e.g., N, O, S, P, F, Cl, Br), functional group with at least one of above-mentioned hetero atoms (e.g., OH, SH, NH, etc.), hydrocarbons (either saturated or unsaturated), or substituted hydrocarbons.

bi-ring structure in the dye. The primary component of the middle bridging unit is a tautomer that translates between conjugated and non-conjugated states. Further, bridging unit and acceptor-donor groups are components of a chromophore that the bridging unit conjugates and deconjugates.

The two adjacent aromatic rings of the BPA type of system can be a single hydrocarbon or heterocycle aromatic ring (i.e., benzene, thiophene, pyrrole, furan, pyridine, etc.), or a poly-aromatic system with or without the heteroatom (i.e., fluorene, pyrene, anthracene, indole, etc.).

The middle-bridging segment may be an isolated conjugated system, which is different than both donor and acceptor units, or it can be a part of conjugation system of either the donor or acceptor unit.

The middle-bridging segment may also be a conjugated system with twisted aromatic rings at its both ends, which are connected directly or indirectly to those aromatic ring systems of either the donor or the acceptor or both through the sigma bond. In some embodiments, the middle bridging unit may be any tautomer that converts between conjugated and non-conjugated states [e.g., enol and keto forms, respectively.

When the middle-bridging segment is connected directly or indirectly to either the donor, or the acceptor, or both, the connecting group can be a single atom (e.g., S, N, O, P, etc.) or atomic group (e.g., ethenyl, ethynyl, azo, imine etc).

The middle-bridging segment may also be connected to either the donor, or the acceptor, or both through a tautomerizable functional group. The tautomerizable functional group can be a ketone, amide, imide, etc, and a tautomerization (e.g. —$CH_2$—CO—↔—CH=C(OH)— and/or —NH—CO—↔—N=C(OH)— type of tautomerization, etc.) can be performed under the influence of the external field.

When the connecting group is an atomic group, it may be switchable between the ON (conjugated state) and the OFF (non-conjugated state) via some kind of tautomerization. The molecule may have a modest dielectric constant and can be easily polarized by an external E-field.

At least one segment of the molecule may have p- and π-electrons that can be mobilized over the entire molecule or a part of the molecule.

The molecule may be symmetrical or asymmetrical; an asymmetrical molecule is preferred in this application.

The inducible dipole(s) of the molecule may be oriented in at least one direction.

When the molecule is polarized induced by an external E-field, the charge transfer from donor to acceptor will result.

The orbitals of the molecule may be delocalized throughout the entire molecule instead of localized only within their fragments units when the molecule is polarized.

It is both an optical absorption red-shifting state and a more electronic conductive state (or ON state) due to a much smaller band gap caused by charge transfer and the highly delocalization state after polarization.

The states of charge transfer or de-transfer product can be E-field dependent or bi-stable, stabilized through inter- or intra-molecular forces such as hydrogen bonding, charge attraction, coulomb forces. etc.

The process of charge transfer of the molecule may or may not involve π-bond breakage or formation.

The process of charge transfer of the molecule may or may not involve some molecular structural tautomerization.

During the charge transferring or de-transferring process activated by an E-field, the band gap of the molecule may change depending on the degree of the p- and π-electron de-localization in the molecule. Both optical and electrical properties of the molecules will be changed accordingly.

When in the OFF state, the p- and π-conjugation path of the molecule is altered by the middle bridging fragment, in which the plane of its aromatic system is no longer aligned with the rest of the molecule (donor and acceptor units). It is in a certain angular relationship with the remaining part of the molecule. The angle is between 10° to 170°, and in some embodiments is in the range of 30° to 150°.

When in the OFF state, the molecule is divided into at least two or more isolated highly localized fragments, and the HOMO/LUMO band gap of the molecule is much larger compared with fully polarized state.

When in the OFF state, there is little charge transfer or no charge transfers between the donor and the acceptor ends.

When in the OFF state, the optical absorption of the molecule is blue shifted.

INDUSTRIAL APPLICABILITY

The capacitive latched bi-stable molecular switch is expected to find use in a variety of devices that require bi-stable switching.

What is claimed is:

1. A charge storage cell comprising two electrodes spaced apart by a dielectric layer incorporating a molecular switch, wherein said molecular switch includes an electric dipole and a donor/switchable bridge/acceptor or D-B-A that are integrated into the structure of a chromophore, and wherein said switchable bridge is a twisted conjugated system that can be switched on or off using an external E-field to electrically connect or disconnect the donor and acceptor to each other.

2. The charge storage cell of claim 1 further including at least one resistance layer for holding charge, said at least one resistance layer positioned between one or both electrodes and said dielectric medium.

3. The charge storage cell of claim 1 wherein said switchable bridge includes two fluorene groups and a tautomerizable group linking one of the two fluorene groups to the acceptor, and wherein the tautomerizable group reversibly switches between an enol configuration and a ketone configuration.

4. The charge storage cell of claim 1 wherein said switchable bridge is a conjugated system with twisted aromatic rings at opposed ends, one of the twisted aromatic rings being directly or indirectly connected to the donor, and an other of the twisted aromatic rings being directly or indirectly connected to the acceptor.

5. The charge storage cell of claim 4 wherein the one of the twisted aromatic rings is directly connected to the donor, wherein the other of the twisted aromatic rings is indirectly connected to the acceptor via a tautomerizable group which is configured to reversibly switch between an enol configuration and a ketone configuration, and wherein the switchable bridge further includes a second tautomerizable group between the twisted aromatic reings, the second tautomerizable group configured to reversibly switch between an enol configuration and a ketone configuration.

6. The charge storage cell of claim 4 wherein the twisted aromatic rings are each independently selected from single hydrocarbon aromatic rings, heterocycle aromatic rings, a poly-aromatic system with a heteroatom, or a poly-aromatic system without a heteroatom.

7. A method of operating a bi-stable, molecular switch charge storage cell comprising two electrodes spaced apart by a dielectric layer incorporating a molecular switch having an electric dipole, said method comprising:

applying a voltage across said dielectric layer to induce opposing charges on said electrodes that create an electric field across said dielectric layer, wherein molecular dipoles within said dielectric layer align or change in response to said electric field, creating an opposing electric field and a change in state of said molecular switch from a first state to a second state; and applying a voltage of reverse polarity across said dielectric layer to change said state of said molecular switch from said second state to said first state;

wherein said molecular switch includes an electric dipole, wherein said molecular switch includes a donor/switchable bridge/acceptor or D-B-A that are integrated into the structure of a chromophore, and wherein said switchable bridge is a twisted conjugated system that can be switched on or off using an external E-field to electrically connect or disconnect the donor and acceptor to each other.

8. The method of claim 7 further including at least one resistance layer for holding charge, said at least one resistance layer positioned between one or both electrodes and said dielectric layer.

9. The method of claim 7 wherein said switchable bridge includes two fluorene groups and a tautomerizable group linking one of the two fluorene groups to the acceptor, and wherein the tautomerizable group reversibly switches between an enol configuration and a ketone configuration.

* * * * *

UNITED STATES PATENT AND TRADEMARK OFFICE
CERTIFICATE OF CORRECTION

PATENT NO. : 7,580,239 B2 Page 1 of 1
APPLICATION NO. : 11/478278
DATED : August 25, 2009
INVENTOR(S) : Kent D. Vincent et al.

It is certified that error appears in the above-identified patent and that said Letters Patent is hereby corrected as shown below:

In column 22, line 49, in Claim 5, delete "reings," and insert -- rings, --, therefor.

Signed and Sealed this

Twenty-third Day of March, 2010

David J. Kappos
*Director of the United States Patent and Trademark Office*